UNITED STATES PATENT OFFICE.

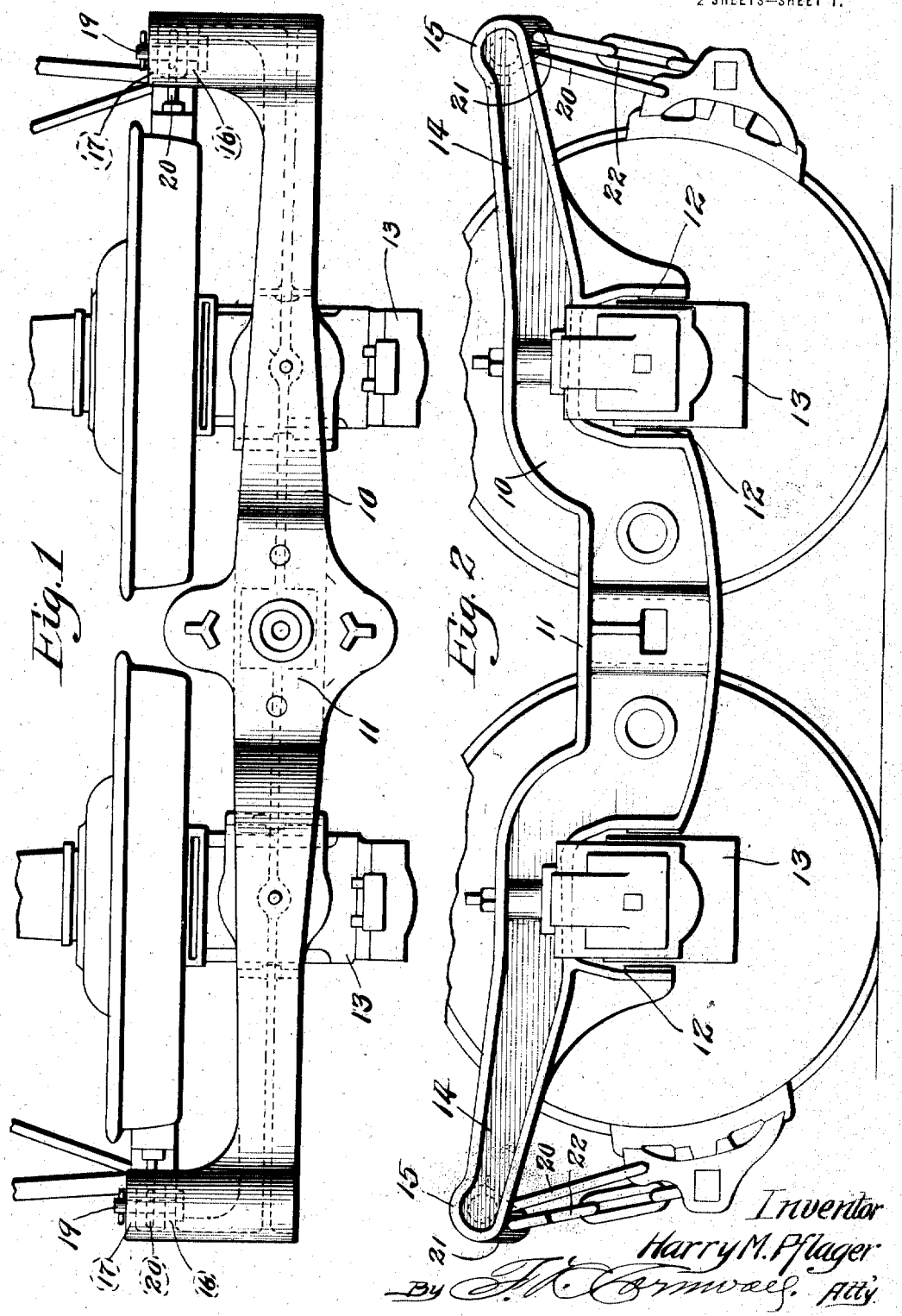

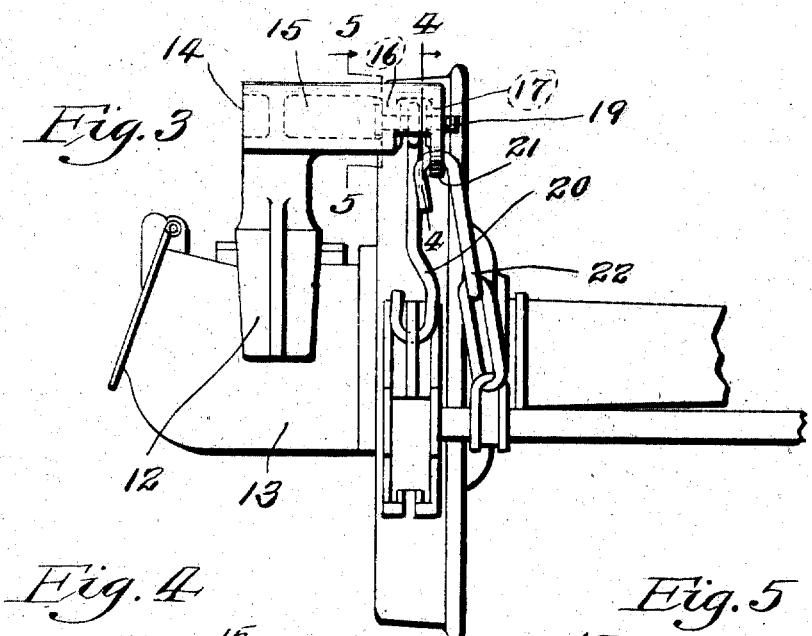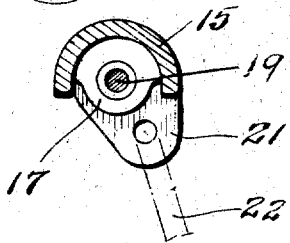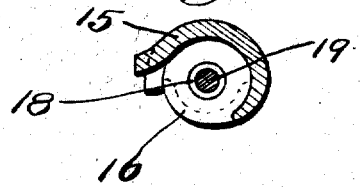

HARRY M. PFLAGER, OF ST. LOUIS, MISSOURI, ASSIGNOR TO COMMONWEALTH STEEL COMPANY, OF ST. LOUIS, MISSOURI, A CORPORATION OF NEW JERSEY.

CAR-TRUCK BRAKE-SUPPORT.

1,280,080.

Specification of Letters Patent. Patented Sept. 24, 1918.

Application filed January 5, 1918. Serial No. 210,449.

*To all whom it may concern:*

Be it known that I, HARRY M. PFLAGER, a citizen of the United States, residing at the city of St. Louis, State of Missouri, have invented a certain new and useful Improvement in Car-Truck Brake-Supports, of which the following is a full, clear, and exact description, such as will enable others skilled in the art to which it appertains to make and use the same, reference being had to the accompanying drawings, forming part of this specification.

My invention relates to car trucks and is particularly designed as an improvement upon the construction disclosed in Reissue Patent No. 14,221 granted to me November 28, 1916, the principal object of my present invention being to provide strong and substantial supports from which the hangers and safety chains for the outside hung brake beams are suspended, said supports being preferably formed integral with and projecting inwardly from the truck side frames at points near the ends thereof.

With the foregoing and other objects in view, my invention consists in certain novel features of construction and arrangement of parts hereinafter more fully described and claimed and illustrated in the accompanying drawings, in which—

Figure 1 is a plan view of the side portion of a truck of my improved construction;

Fig. 2 is a side elevational view of the truck;

Fig. 3 is an end elevational view of the side portion of the truck;

Fig. 4 is an enlarged detail section taken approximately on the line 4—4 of Fig. 3;

Fig. 5 is an enlarged cross section taken approximately on the line 5—5 of Fig. 3.

Referring by numerals to the accompanying drawings, which illustrate a practical embodiment of my invention, 10 designates one of the side frames or wheel pieces, the same being preferably cast and provided at its center with a spring seat 11. The underside of the side frame 10 is recessed, as designated by 12, to receive the usual journal boxes 13, and the ends of the side frame are extended a substantial distance beyond the journal box openings, as designated by 14. Formed integral with these extensions and projecting inwardly therefrom are comparatively short arms or brackets 15, the inner ends of which terminate in substantially the same plane with the flanges of the adjacent pair of truck wheels. These arms or brackets are substantially of inverted U-shape in cross section, and formed integral with each arm or bracket and on the underside thereof is a pair of vertically disposed webs or plates 16 and 17, the same being spaced a slight distance apart. Seated in the central portions of these webs are bushing rings 18, the same serving as bearings for a pin 19, the latter serving as attaching means for the upper end of the brake hanger 20. The brake hanger supporting pins 19 project inwardly through the webs 16 and 17 with respect to the side frame, and inserted through suitably formed apertures in the inner ends of said pins are keys or cotter pins. Formed integral with web 17 which is at the end of the arm or bracket is a depending ear 21, the same being perforated in order to receive a hook at the upper end of the brake beam safety chain 22. Thus the inner end of the arm or bracket 15 is provided with means serving as points of attachment for the upper ends of the hanger and safety chain for an outside hung brake beam, and as said arm or bracket is formed integral with the end of the truck side frame, it serves as a very strong, rigid and substantial support for the attached parts.

The improved construction comtemplated by my invention is comparatively simple, adds little or no cost to the manufacture of the truck, and provides a strong, substantial and efficient support for the upper ends of the hangers and safety chains for outside hung brake beams.

It will be readily understood that minor changes in the size, form and construction of the various parts of my improved car truck may be made and substituted for those herein shown and described, without departing from the spirit of my invention, the scope of which is set forth in the appended claims.

I claim:

1. In a car truck, a side frame provided with inwardly projecting portions near its ends, spaced webs integral with said in-wardly projecting portions, pins removably seated in said spaced webs and serving as points of attachment for the brake beam hangers, and one web of each pair being provided with an extension which serves as a point of attachment for the brake beam safety chain.

2. In a car truck, a side frame provided with inwardly projecting portions, members removably seated in said inwardly projecting portions and serving as points of attachment for the upper ends of brake beam hangers, and perforated ears on said inwardly projecting portions, which perforated ears are adapted to serve as points as attachment for the brake beam safety chains.

In testimony whereof I hereunto affix my signature, this 27th day of December, 1917

HARRY M. PFLAGER.